United States Patent [19]

Hill

[11] Patent Number: 5,619,278

[45] Date of Patent: Apr. 8, 1997

[54] METHOD AND APPARATUS FOR PROCESSING A GHOST CANCELLATION REFERENCE SIGNAL

[75] Inventor: Rae L. Hill, Jefferson City, Tenn.

[73] Assignee: U.S. Philips Corporation, New York, N.Y.

[21] Appl. No.: 548,112

[22] Filed: Oct. 25, 1995

[51] Int. Cl.$^6$ ..................................................... H04N 5/21
[52] U.S. Cl. ........................................... 348/614; 348/611
[58] Field of Search ..................................... 348/614, 611, 348/607; H04N 5/21, 5/213

[56] References Cited

U.S. PATENT DOCUMENTS

| | | | |
|---|---|---|---|
| 5,047,859 | 9/1991 | Koo | 358/187 |
| 5,121,211 | 6/1992 | Koo | 358/187 |
| 5,386,243 | 1/1995 | Huang et al. | 348/614 |
| 5,389,977 | 2/1995 | Lee | 348/614 |
| 5,481,316 | 1/1996 | Patel | 348/614 |

*Primary Examiner*—Glenton B. Burgess
*Attorney, Agent, or Firm*—Edward W. Goodman

[57] ABSTRACT

In a ghost cancellation system, it is necessary to synchronize the system to the ghost cancellation reference (GCR) signal contained in the video signal. A free-running oscillation, having a frequency which is the same as that used in generating a reference GCR signal, is used to clock the sampling of the video signal. This assures frequency coherence between the input GCR signal and the stored reference GCR signal. By using cross-correlation, the phase error between the sampled input GCR signal and the stored GCR signal is determined. Based on this phase error, a phase-corrected reference GCR signal is generated and stored. This phase-corrected reference GCR signal is then used in the generation of an error function involving the sampled input GCR signal, the error function being used for eliminating ghosts in the input video signal.

16 Claims, 5 Drawing Sheets

5,619,278

METHOD AND APPARATUS FOR PROCESSING A GHOST CANCELLATION REFERENCE SIGNAL

BACKGROUND OF THE INVENTION

1. Field of The Invention

The subject invention relates to a ghost cancellation system and a circuit for detecting and synchronizing to a ghost cancellation reference signal contained in a television signal.

2. Description of The Related Art

U.S. Pat. Nos. 5,047,859 and 5,121,211 both to Koo disclose a signal which, when transmitted with a standard television signal, enables a corresponding circuit to correct said signal thereby eliminating "ghost", i.e., errors in the signal arising from, for example, reflections from buildings, terrain, etc. The ghost cancellation reference (GCR) signal provided in the television input video signal vertical interval is used as an input to an adaptive filter algorithm. This algorithm provides coefficients to digital filters which cancel secondary echo-like signals from the main input signal. For a ghost canceler to be effective, the ghost cancellation reference (GCR) signal must be sampled by an analog-to-digital (A/D) converter and the sampled signal compared to a reference signal. The GCR signal is transmitted every field and is sequenced so that all other static video characteristics can be discriminated and removed algebraically over an 8 field period. For optimum performance, the sampling clock should maintain phase coherence from one field sample set to the next. There should also be a zero phase difference between the sampled GCR signal and a stored reference GCR signal.

Presently, video characteristics are used to maintain phase coherence between sample sets. This is accomplished by phase-locked loop circuits using either the chroma burst or the horizontal synchronization signal as a reference. If the reference phase is sufficiently detected, then the phase coherence between sample sets can be maintained. However, badly ghosted signals severely distort both the chroma burst and the horizontal synchronization signal. As such, the phase-locked loop circuits cannot provide phase coherence and, in addition, provide additional phase errors.

It is unlikely that all phase-locked loop circuits can provide a zero phase difference between the sampled GCR signal and the stored reference GCR signal because the steady-state error of all circuits would have to be equal and sufficient to provide the correct phase. Additionally, the GCR signal has a flat spectrum in the range 0 to 4.2 MHz. over several sampling clocks. A phase-locked loop circuit which is pulling the sampling clock over the sample set will distort the spectrum as well. Phase-locked loop circuits using the video horizontal synchronization signal have a bandwidth sufficiently wide to allow frequency incoherence between sample sets. This is especially true under ghosting conditions because the reference synchronization signals are highly prone to error.

SUMMARY OF THE INVENTION

It is an object of the present invention to provide a method and apparatus for maintaining a zero phase difference coherence between the sampled GCR signal and the stored reference GCR signal.

It is a further object of the invention to provide a method and apparatus for cancelling ghosts in an input video signal in which a zero phase difference coherence is maintained between the sampled GCR signal and the stored reference GCR signal.

The above objects are achieved in a method for maintaining a zero phase difference coherence between a sampled GCR signal and a stored reference GCR signal, comprising the steps of sampling an input video signal containing a GCR signal with a free-running clock having a predetermined frequency constancy, comparing the sampled GCR signal to the stored reference GCR signal, said comparison including calculating an error function involving the GCR signal in the input video signal, using the reference GCR signal, determining a phase difference between the GCR signal in the input video signal and the stored reference GCR signal using the error function, calculating a phase-corrected reference GCR signal using the calculated phase difference, storing the phase-corrected reference GCR signal, calculating a new error function involving the GCR signal in the input video signal, using the phase-corrected reference GCR signal, whereby the new error function will have the sampling phase error removed, and storing the new error function for sequential field calculations.

BRIEF DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENTS

Figure 1:
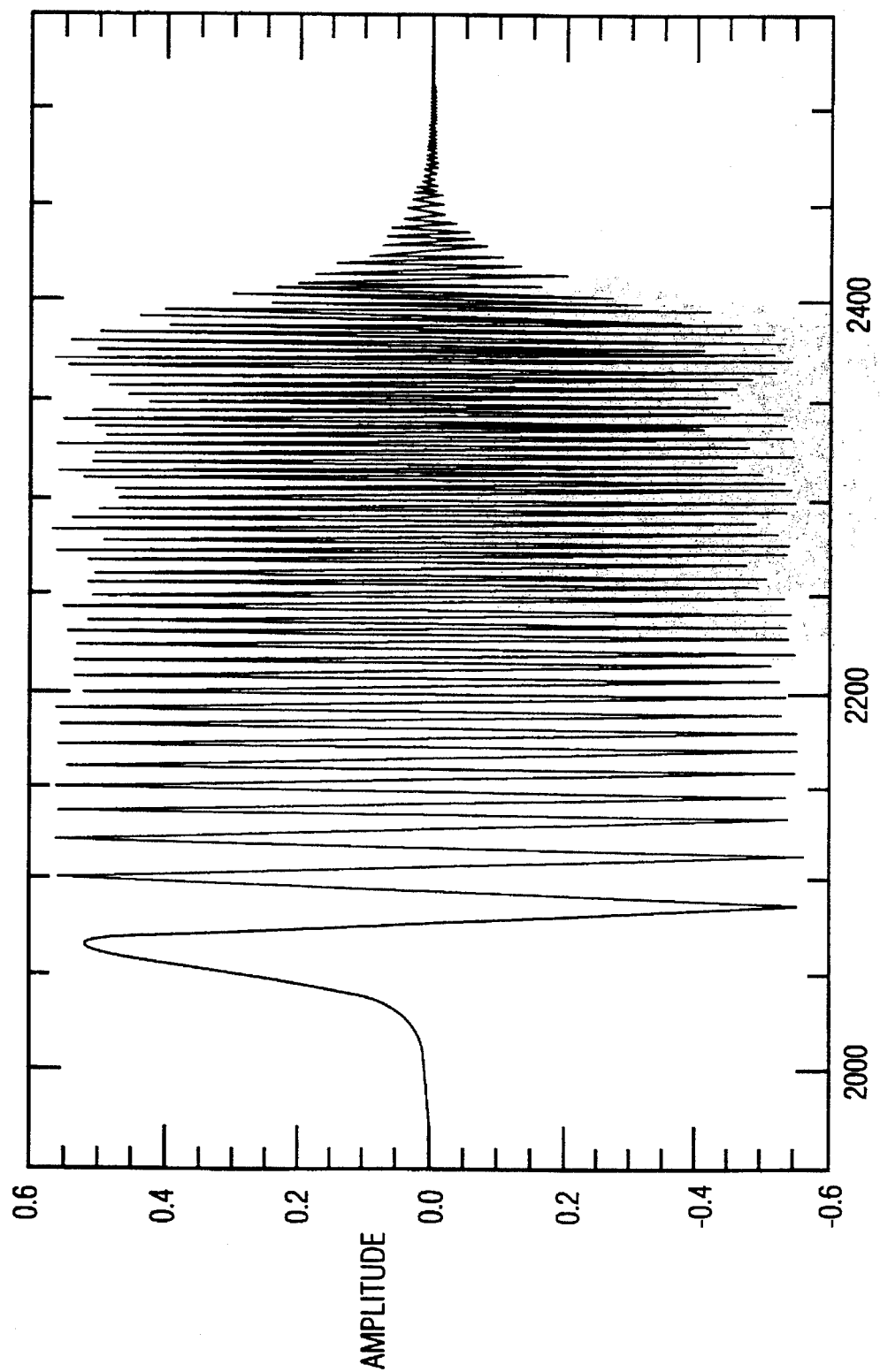
FIG. 1 shows a graphical representation of the GCR signal in an NTSC video signal.

FIG. 1 shows a representation of a ghost cancellation reference (GCR) signal which is provided in the television input video signal vertical interval. This GCR signal is in conformance with that disclosed in the above two Koo patents.

Figure 2A:
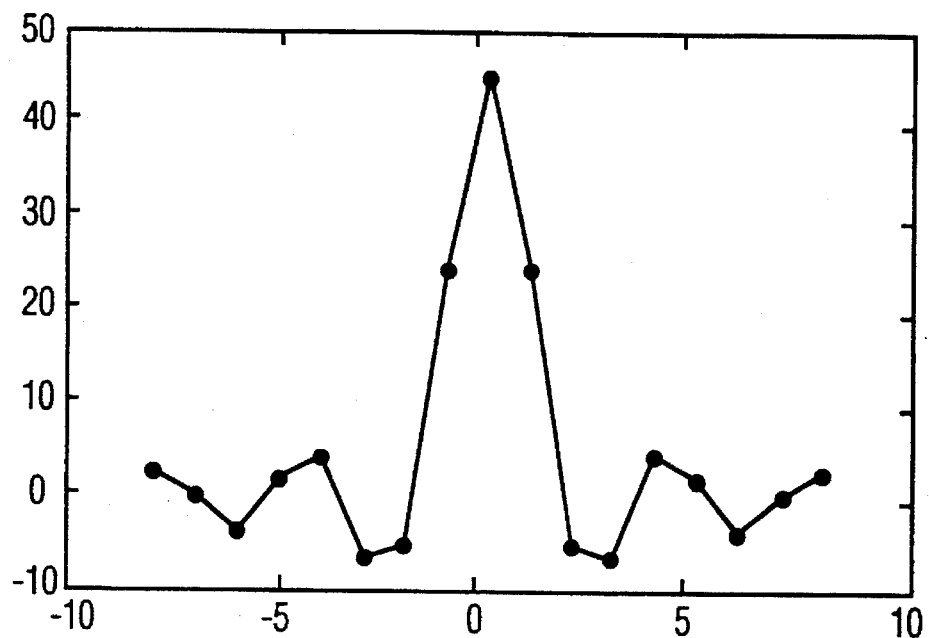
FIG. 2A shows a plot of a sin(x)/x function illustrating the auto-correlation function of the GCR signal.
Figure 2B:
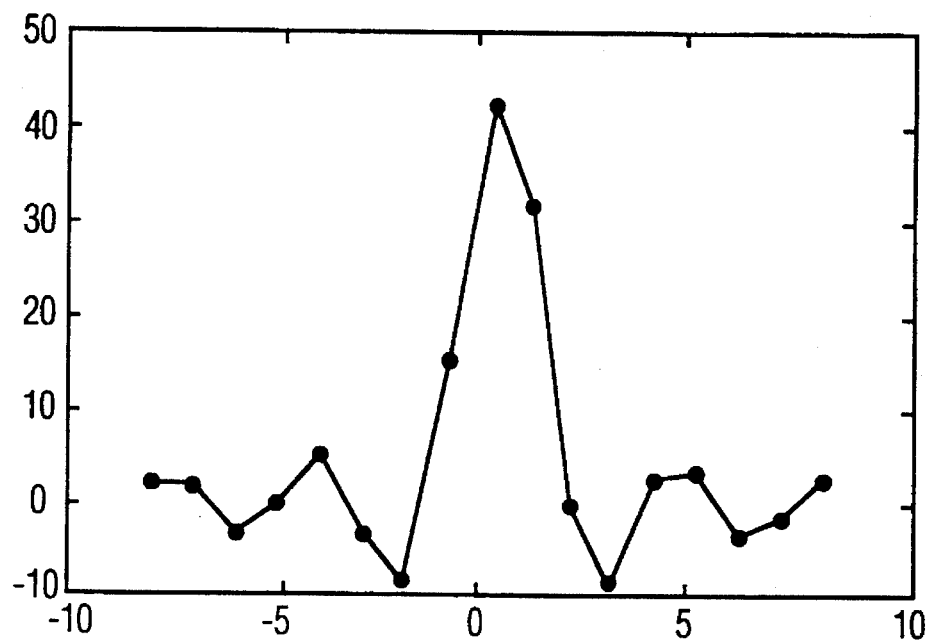
FIG. 2B shows a plot similar to FIG. 2A in which there is a cross-correlation of two GCR signals with different phases of the sample sets.

As indicated above, when sampling the GCR signal, there should be a zero phase difference between the sampled GCR signal and a reference GCR signal stored in the receiver. The input phase is found by analyzing the cross-correlation of the input GCR signal and the stored reference GCR signal. FIG. 2A shows the case where there is a zero phase difference. However, FIG. 2B shows the cross-correlation function where the sampled GCR signal and the stored reference GCR signal have different phases.

Figure 3:
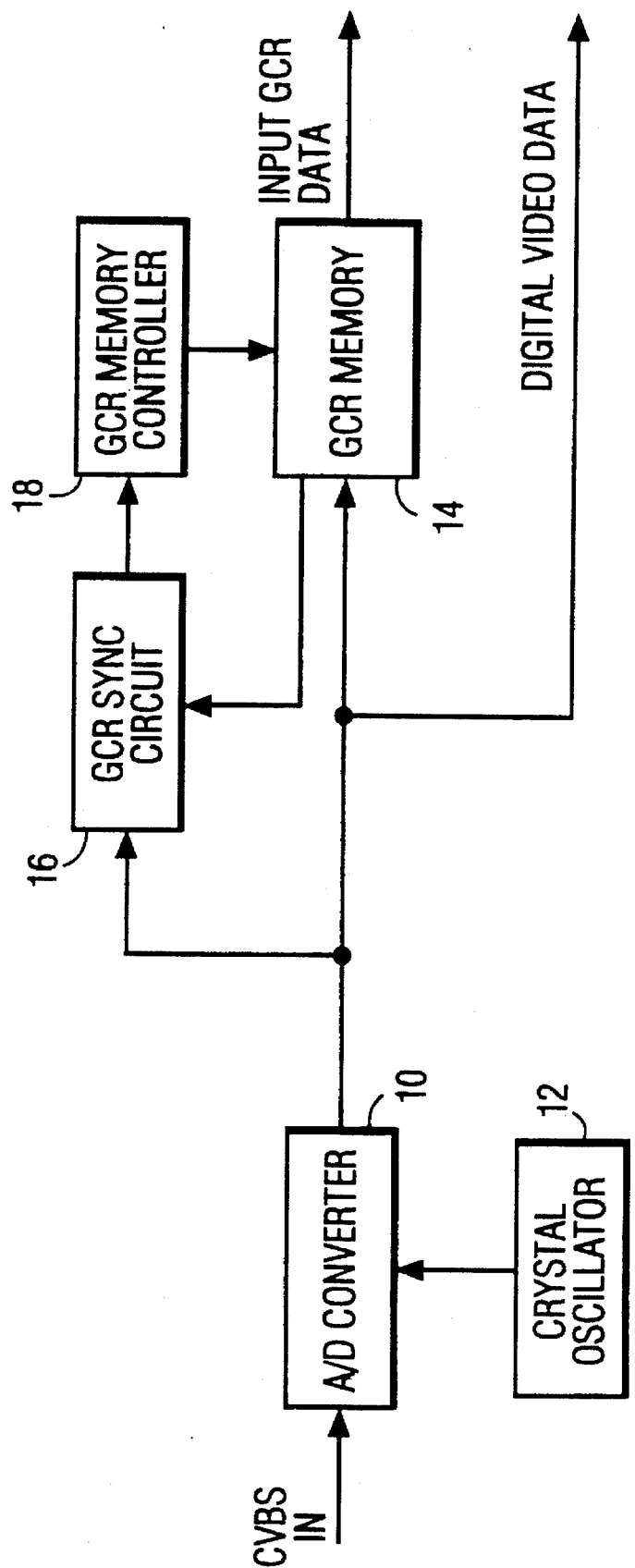
FIG. 3 shows a block diagram of an input section of a ghost canceler.
Figure 4:
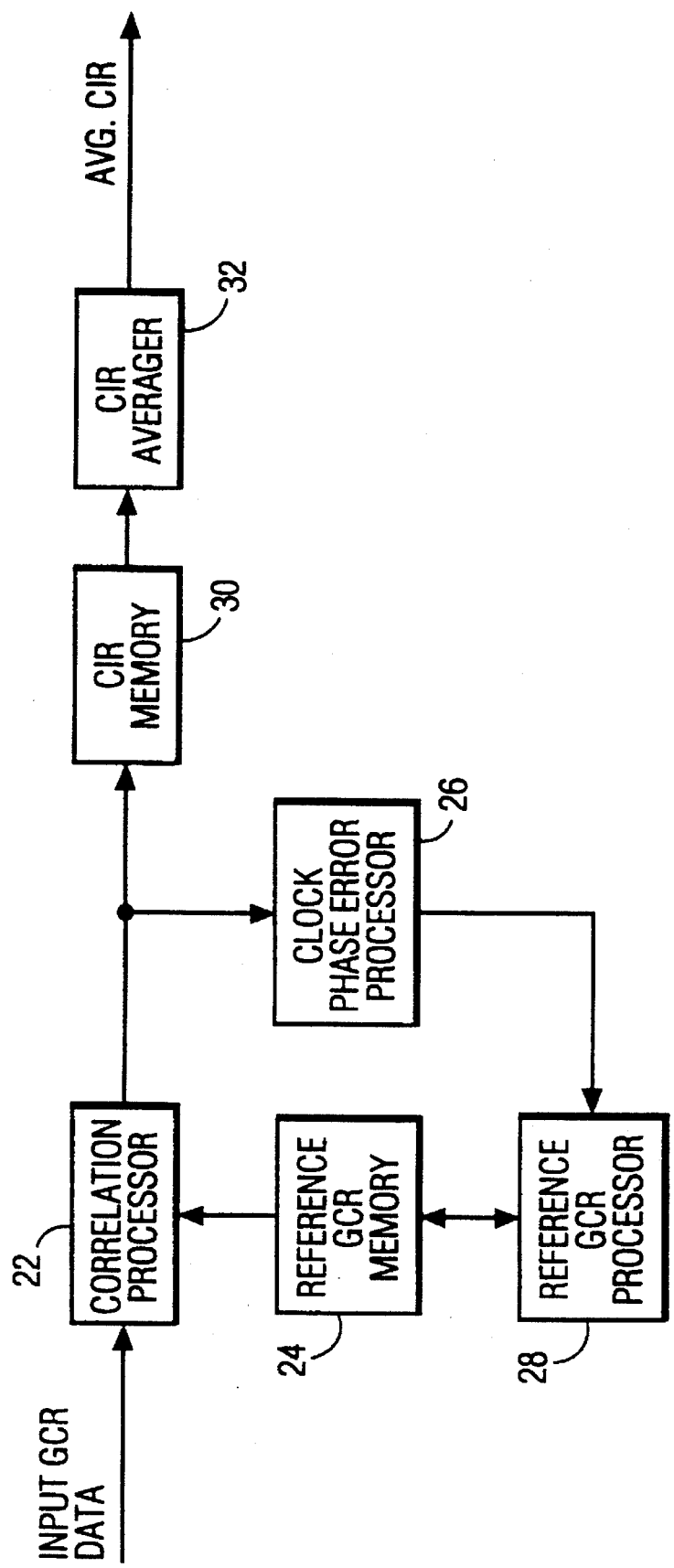
FIG. 4 shows a block diagram of a channel impulse response processing section of the ghost canceler.
Figure 5:
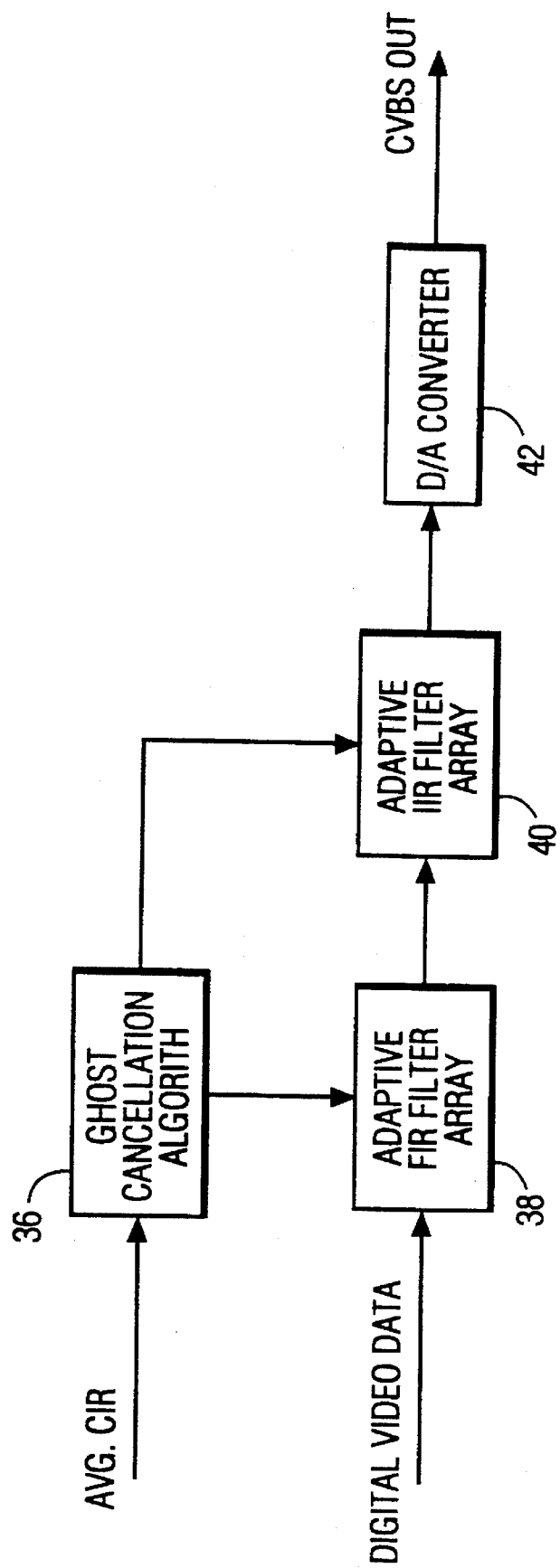
FIG. 5 shows a block diagram of an output section of the ghost canceler.

FIGS. 3–5 show an embodiment of a ghost canceler using the principles of the subject invention. In particular, an input section of the ghost canceler is shown in FIG. 3. The input video signal (CVBS) is applied to an input of an analog-to-digital (A/D) converter 10. A clock input of the A/D converter 10 receives a clock signal from a clock signal generator 12. The clock signal generator 12 is a free-running crystal oscillator having a substantially constant running frequency which is chosen to be equal to the frequency at which the reference GCR signal had been generated. As such, the sampled data sets at the output of the A/D converter 10 have frequency coherence with the stored reference GCR signal, thereby limiting the maximum phase error of the sampled input data relative to the reference GCR signal to one sample clock period.

The A/D converter 10 provides the sampled video data to the rest of the ghost cancellation system in which the digital video data is sent to filter arrays to be de-ghosted. A portion of the digital video data containing the sampled GCR signal is stored in the input GCR memory 14 for further use in the ghost cancellation algorithm.

In order to gate the GCR memory 14 at the appropriate time to store the sampled GCR signal, the digital video signal is applied from the A/D converter 10 to a GCR synchronization circuit 16 which determines the occurrence of the GCR signal in the input video signal. One such GCR synchronization circuit 16 is disclosed in co-pending patent application Ser. No. 08/539,567, filed Oct. 4, 1995, assigned to the Assignee of the subject application. The transmitted GCR signal is periodic and, due to the sampling clock signal being generated by a stable crystal oscillator, the period is measurable and each successive GCR data is very accurately predictable by the GCR synchronization circuit 16. The windowed portion of the digital video data must be large enough to include the GCR signal and extra data on both sides of the GCR signal data in case there is an error in the prediction.

The predicted occurrence information of the subsequent transmitted GCR signal, as determined by the GCR synchronization circuit 16 is applied to the GCR memory controller 18 so that the predicted data (as separate from the rest of the digital video data) and the error window data may be stored in the GCR memory 14. If there is an error in the prediction, the GCR synchronization circuit 16 determines the error using the data stored in the GCR memory, and then uses the error to adjust the predicted occurrence of the subsequent sample set. The adjusted predicted occurrence data is then calculated by the GCR synchronization circuit 16 and passed to the memory controller 18, so that the memory controller 18 can apply the correct data vector to the GCR memory 14.

FIG. 4 shows the channel impulse response processing portion of the ghost cancellation system. In particular, the input GCR data from the GCR memory 14 is applied to a correlation processor 22. The auto-correlation of the GCR signal simulates the behavior of cross-correlation of two in-phase GCR signals. This auto-correlation resultant is a sin(x)/x function which has the property of symmetry about the maximum (or main) peak (see FIG. 2A). The correlation processor 22 performs a cross-correlation between the stored reference GCR signal obtained from the reference GCR memory 24 and the input GCR data. If there is a difference in the phase of the sampled data set and the reference data set, the symmetry of the resultant cross-correlation vector about the maximum correlation peak is disturbed. The cross-correlation vector is captured by the clock phase error processor 26.

The clock phase error processor 26 uses the asymmetry in the cross-correlation vector to determine the phase error in the sampled data vector (input GCR data) relative to the desired sampling phase. One way to determine the phase error is to extract the maximum peak and the immediate points to either side of the maximum peak and use these points to very closely approximate the input phase error. Once the phase error is determined to the desired accuracy, the information is applied to the reference GCR processor 28.

Since the reference GCR signal is a vector with known and fixed characteristics, the phase of this vector can be modified with a pre-programmed process. The sampled data vector cannot be so modified since all the characteristics of the input function are not known, and determination of these characteristics would require further processing. The phase error of the sampled data is used by the reference GCR processor 28 to generate a new reference GCR vector which is in phase with the input GCR data vector. This vector is designated the phase-corrected reference GCR signal and is used with only the present input GCR data. Any subsequent input GCR data sets require the calculation of another phase-corrected reference GCR signal.

The correlation processor 22 then again cross-correlates the phase-corrected reference GCR signal with the input GCR data. The result is a series of symmetrical sin(x)/x vectors which form the channel impulse response (CIR) of the input GCR data. The symmetry of the main sin(x)/x vector demonstrates that the phase-corrected reference GCR signal and the input GCR data are in phase. This CIR vector is applied to the CIR memory 30 and subsequently used to determine the strengths and locations of echoes (ghosts) in the channel.

The transmitted GCR signal is designed so that a sequence of GCR's can be processed in such a way that all video characteristics can be removed prior to submission of the GCR signal to the ghost cancellation algorithm. In present ghost cancellation systems, input GCR data sets are averaged over enough sample sets so that the mean has all the video characteristics removed. If the phase of the sample function is not constant between sample sets, the averaging process of the sample sets low-pass filters the resultant mean vector. The ghost cancellation algorithm then equalizes the channel to the reference GCR signal causing an over-compensation of the frequencies in the upper part of the video spectrum. The chroma then appears to be over saturated and sharp edges may "ring".

In the present embodiment, the CIR's are acquired and corrected so as to be phase coherent between CIR data sets. The CIR sample sets are then averaged in to remove the video characteristics. Since the ghost cancellation system is linear, the averaging of the channel impulse responses achieves the same result as averaging the input GCR data sets. Hence the CIR data sets are stored in the CIR memory 30 until the desired number of sets to be averaged is reached. CIR averager 32 then averages the data.

As shown in FIG. 5, the averaged CIR is now applied to a ghost cancellation algorithm circuit 36. The ghost cancellation algorithm circuit 36 uses an adaptive technique to model the inverse of the input channel. A common adaptive technique is the least means square (LMS) method used to produce coefficients in a filter array. For ghost cancellation, an adaptive finite impulse response (FIR) digital filter array 38 is used to cancel pre-ghosts and close-in post-ghosts. The digital video data is applied to this adaptive FIR filter array 38 which receives its coefficients from the ghost cancellation algorithm circuit 36. An output from the adaptive FIR filter array 38 is applied to an input of an adaptive infinite impulse response (IIR) digital filter array 40 for cancelling long post ghosts. The adaptive IIR filter array 40 also receives its coefficients from the ghost cancellation algorithm circuit 36. The FIR coefficients and the IIR coefficients generated by the ghost cancellation algorithm circuit 36 represent the inverse channel model of the digital video data.

The filtered digital video data then is applied to a digital-to-analog (D/A) filter 42 thereby forming a de-ghosted CVBS output video signal.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. A method for maintaining a zero phase difference coherence between a sampled GCR signal and a stored reference GCR signal, comprising the steps:

sampling an input video signal containing a GCR signal with a free-running clock having a predetermined frequency constancy;

comparing the sampled GCR signal to the stored reference GCR signal, said comparison including calculating an error function involving the GCR signal in the input video signal, using the reference GCR signal;

determining a phase difference between the GCR signal in the input video signal and the stored reference GCR signal using the error function;

calculating a phase-corrected reference GCR signal using the calculated phase difference;

storing the phase-corrected reference GCR signal;

calculating a new error function involving the GCR signal in the input video signal, using the phase-corrected reference GCR signal, whereby the new error function will have the phase difference removed; and storing the new error function for sequential field calculations.

2. The method as set forth in claim 1, wherein the calculation of the phase difference is approximated from a correlation function of the GCR signal in the input video signal and the reference GCR signal.

3. The method as set forth in claim 1, wherein the frequency of said free-running clock is the same as a frequency at which the stored reference GCR signal is generated.

4. The method as set forth in claim 1, wherein said sampling step comprises:

sampling an input video signal containing a GCR signal with said free-running clock having said predetermined frequency constancy;

predicting the position of the GCR signal in said sampled input video signal;

determining a window signal based on said predicted position of the GCR signal;

storing a portion of said sampled input video signal based on said window signal;

determining whether said stored portion of said sampled input video signal actually contains the entire GCR signal;

generating a modified predicted position of the GCR signal using said determination;

generating a modified window signal based on said modified predicted position; and storing the GCR signal in the sampled input video signal.

5. A method for removing ghosts from a video signal comprising the steps:

sampling an input video signal containing a GCR signal with a free-running clock having a predetermined frequency constancy;

comparing the sampled GCR signal to the stored reference GCR signal, said comparison including calculating an error function involving the GCR signal in the input video signal, using the reference GCR signal;

determining a phase difference between the GCR signal in the input video signal and the stored reference GCR signal using the error function;

calculating a phase-corrected reference GCR signal using the calculated phase difference;

storing the phase-corrected reference GCR signal;

calculating a new error function involving the GCR signal in the input video signal, using the phase-corrected reference GCR signal, whereby the new error function will have the sampling phase error removed;

calculating filter coefficients for an adaptive finite impulse response (FIR) filtering operation from said new error function;

performing said adaptive FIR filtering operation on said sampled input video signal;

calculating filter coefficients for an adaptive infinite impulse response (IIR) filtering operation;

performing said adaptive IIR filtering operation on said FIR filtered sampled input video signal; and converting said FIR and IIR filtered sampled input video signal into an analog output video signal, whereby said analog output video signal is ghost-free.

6. The method as claimed in claim 5, wherein the calculation of the phase difference is approximated from the correlation function of the GCR signal in the input video signal and the reference GCR signal.

7. The method as set forth in claim 5, wherein the frequency of said free-running clock is the same as a frequency at which the stored reference GCR signal is generated.

8. The method as set forth in claim 5, wherein said sampling step comprises:

sampling said input video signal containing said GCR signal with said free-running clock having said predetermined frequency constancy;

predicting the position of the GCR signal in said sampled input video signal;

determining a window signal based on said predicted position of the GCR signal;

storing a portion of said sampled input video signal based on said window signal;

determining whether said stored portion of said sampled input video signal actually contains the entire GCR signal;

generating a modified predicted position of the GCR signal using said determination;

generating a modified window signal based on said modified predicted position; and storing the GCR signal in the sampled input video signal.

9. An apparatus for maintaining a zero phase difference coherence between a sampled GCR signal and a stored reference GCR signal, comprising:

an input for receiving an input video signal containing a GCR signal;

means for storing a reference GCR signal;

a free-running clock signal generator having a predetermined frequency constancy for generating a free-running clock signal;

means for sampling said input video signal to obtain a sampled GCR signal using said free-running clock signal;

means for comparing the sampled GCR signal to the stored reference GCR signal, said comparing means comprising means for calculating an error function involving the GCR signal in the input video signal, using the reference GCR signal;

means for determining a phase difference between the GCR signal in the input video signal and the stored reference GCR signal using the error function;

means for calculating a phase-corrected reference GCR signal using the calculated phase difference;

means for storing the phase-corrected reference GCR signal;

means for calculating a new error function involving the GCR signal in the input video signal, using the phase-corrected reference GCR signal, whereby the new error function will have the phase difference removed; and means for storing the new error function for sequential field calculations.

10. The apparatus as set forth in claim 9, wherein in the means for determining the phase difference, the phase difference is approximated from a correlation function of the GCR signal in the input video signal and the reference GCR signal.

11. The apparatus as set forth in claim 9, wherein the frequency of said free-running clock signal is the same as a frequency at which the stored reference GCR signal had been generated.

12. The apparatus as set forth in claim 9, wherein said means for sampling comprises:

means for sampling said input video signal containing said GCR signal with said free-running clock having said predetermined frequency constancy;

means for predicting the position of the GCR signal in said sampled input video signal;

means for determining a window signal based on said predicted position of the GCR signal;

means for storing a portion of said sampled input video signal based on said window signal;

means for determining whether said stored portion of said sampled input video signal actually contains the entire GCR signal;

means for generating a modified predicted position of the GCR signal using said determination;

means for generating a modified window signal based on said modified predicted position; and means for storing the GCR signal in the sampled input video signal.

13. An apparatus for removing ghosts in an input video signal, said apparatus comprising:

means for sampling an input video signal containing a GCR signal with a free-running clock having a predetermined frequency constancy;

means for comparing the sampled GCR signal to the stored reference GCR signal, said comparison including calculating an error function involving the GCR signal in the input video signal, using the reference GCR signal;

means for determining a phase difference between the GCR signal in the input video signal and the stored reference GCR signal using the error function;

means for calculating a phase-corrected reference GCR signal using the calculated phase difference;

means for storing the phase-corrected reference GCR signal;

means for calculating a new error function involving the GCR signal in the input video signal, using the phase-corrected reference GCR signal, whereby the new error function will have the sampling phase error removed;

means for calculating filter coefficients for an adaptive finite impulse response (FIR) filtering operation from said new error function;

means for performing said adaptive FIR filtering operation on said sampled input video signal;

means for calculating filter coefficients for an adaptive infinite impulse response (IIR) filtering operation;

means for performing said adaptive IIR filtering operation on said FIR filtered sampled input video signal; and means for converting said FIR and IIR filtered sampled input video signal into an analog output video signal, whereby said analog output video signal is ghost-free.

14. The apparatus as set forth in claim 13, wherein in the means for determining the phase difference, the phase difference is approximated from a correlation function of the GCR signal in the input video signal and the reference GCR signal.

15. The apparatus as set forth in claim 13, wherein the frequency of said free-running clock signal is the same as a frequency at which the stored reference GCR signal had been generated.

16. The apparatus as set forth in claim 13, wherein said means for sampling comprises:

means for sampling said input video signal containing said GCR signal with said free-running clock having said predetermined frequency constancy;

means for predicting the position of the GCR signal in said sampled input video signal;

means for determining a window signal based on said predicted position of the GCR signal;

means for storing a portion of said sampled input video signal based on said window signal;

means for determining whether said stored portion of said sampled input video signal actually contains the entire GCR signal;

means for generating a modified predicted position of the GCR signal using said determination;

means for generating a modified window signal based on said modified predicted position; and means for storing the GCR signal in the sampled input video signal.

\* \* \* \* \*